United States Patent
Tai et al.

(10) Patent No.: US 10,896,571 B2
(45) Date of Patent: Jan. 19, 2021

(54) AUXILIARY DEVICE FOR GAMING DEVICE

(71) Applicant: PRIMAX ELECTRONICS LTD., Taipei (TW)

(72) Inventors: Shou-Kuo Tai, Taipei (TW); Wun-Ting Jheng, Taipei (TW); Chen-Way Chou, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 10 days.

(21) Appl. No.: 16/578,446

(22) Filed: Sep. 23, 2019

(65) Prior Publication Data

US 2020/0184768 A1   Jun. 11, 2020

Related U.S. Application Data

(60) Provisional application No. 62/776,488, filed on Dec. 7, 2018.

(51) Int. Cl.
  *G07F 17/32* (2006.01)
  *A63F 13/2145* (2014.01)
  *A63F 13/235* (2014.01)

(52) U.S. Cl.
  CPC ...... *G07F 17/3225* (2013.01); *A63F 13/2145* (2014.09); *A63F 13/235* (2014.09); *G07F 17/3218* (2013.01)

(58) Field of Classification Search
  USPC .......................................................... 463/20
  See application file for complete search history.

(56) References Cited

U.S. PATENT DOCUMENTS

| | | | |
|---|---|---|---|
| 6,319,125 B1* | 11/2001 | Acres | G07F 17/32 463/25 |
| 6,910,964 B2* | 6/2005 | Acres | G07F 17/32 463/20 |
| 2003/0148807 A1* | 8/2003 | Acres | G07F 17/323 463/26 |
| 2012/0204107 A1* | 8/2012 | Salinas | G06F 16/70 715/716 |

* cited by examiner

*Primary Examiner* — Pierre E Elisca
(74) *Attorney, Agent, or Firm* — WPAT, PC (57) ABSTRACT

An auxiliary device for a gaming device is provided. The auxiliary device includes a support body, a connecting part, a first insertion slot and a second insertion slot. The support body is coupled with the gaming device. The connecting part is disposed on the support body. The connecting part is inserted into a connection port of the gaming device, so that the auxiliary device is electrically connected with the gaming device. The first insertion slot is formed in a first outer surface of the support body, and exposed outside the support body. The first insertion slot is connected with a charging cable of the gaming device. The second insertion slot is formed in a second outer surface of the support body, and exposed outside the support body. The second insertion slot is connected with a charging dock of the gaming device.

11 Claims, 11 Drawing Sheets

AUXILIARY DEVICE FOR GAMING DEVICE

CROSS-REFERENCE TO RELATED APPLICATION

This application claims priority to U.S. Provisional Patent Application No. 62/776,488 filed Dec. 7, 2018, the contents of which are incorporated herein by reference.

FIELD OF THE INVENTION

The present invention relates to an auxiliary device, and more particularly to an auxiliary device for a gaming device.

BACKGROUND OF THE INVENTION

In the early stage, the gaming software is installed in a cassette or an optical disc, and a dedicated game console is needed to execute the gaming software. For example, the Nintendo game consoles in the earliest stage and the well-received Play Stations 1 to 4, Nintendo Wii and Nintendo Switch in the later stage are the examples of the dedicated game consoles. With the advancement of science and technology, users are increasingly pursuing the variability and interesting efficacy of games. Therefore, the game manufactures make efforts in developing new games in order to gain the favor of users.

For example, the well-received Nintendo Switch in the recent years comprises a game console and two handlebar controllers. The handlebar controllers and the game console are selectively combined together or separated from each other to provide plural play modes and work with the corresponding game software. Consequently, the diversity of playing games is increased. For example, these play modes include a tabletop mode, a handheld mode and a TV mode. In the tabletop mode, the two handlebar controllers and the game console are separated from each other. In addition, the game console is placed on a table surface or other flat platform, and the handlebar controllers are held by the user's hands. In the handheld mode, the two handlebar controllers and the game console are combined together. In addition, the combination of the two handlebar controllers and the game console is held by the user's hands. In the TV mode, the two handlebar controllers and the game console are separated from each other. The game console is placed on a charging dock (also referred as Switch Dock). The gaming screen of the game console is displayed on the TV set that is in wireless communication with the game console. In addition, the handlebar controllers are held by the use's hands.

Although Nintendo Switch can be operated in many play modes, there are still some drawbacks. For example, since Nintendo Switch provides so many gaming softwares, the play modes of Nintendo Switch are not suitable for all gaming softwares. Therefore, there is a need of providing an auxiliary device for a gaming device in order to help the user input gaming commands.

Moreover, in the tabletop mode, the game console has to be placed on a table surface or other flat platform. Generally, the charging port of the game console is located under the game console. Since the charging port is not located outside the game console, the user cannot play the game during the charging process.

Therefore, there is a need of providing an auxiliary device for a gaming device in order to simultaneously play the game and charge the gaming device.

SUMMARY OF THE INVENTION

An object of the present invention provides an auxiliary device for a gaming device in order to help the user input gaming commands in order to facilitate playing the game.

Another object of the present invention provides an auxiliary device for a gaming device in order to simultaneously play the game and charge the gaming device.

In accordance with an aspect of the present invention, an auxiliary device for a gaming device is provided. The auxiliary device is combined with the gaming device. The auxiliary device includes a support body, a connecting part, a first insertion slot and a second insertion slot. The support body is coupled with the gaming device. The connecting part is disposed on the support body. The connecting part is inserted into a connection port of the gaming device, so that the auxiliary device is electrically connected with the gaming device. The first insertion slot is formed in a first outer surface of the support body, and exposed outside the support body. The first insertion slot is connected with a charging cable of the gaming device. The second insertion slot is formed in a second outer surface of the support body, and exposed outside the support body. The second insertion slot is connected with a charging dock of the gaming device.

In accordance with another aspect of the present invention, an auxiliary device for a gaming device is provided. The auxiliary device is combined with the gaming device. The auxiliary device includes a protective cover, a connecting part, a first insertion slot and a second insertion slot. The gaming device is partially covered by the protective cover. The connecting part is disposed on an inner surface of the protective cover. When the gaming device is partially covered by the protective cover and the connecting part is inserted into a connection port of the gaming device, the auxiliary device is electrically connected with the gaming device. The first insertion slot is formed in a first outer surface of the protective cover, and exposed outside the protective cover. The first insertion slot connected with a charging cable of the gaming device. The second insertion slot formed in a second outer surface of the protective cover, and exposed outside the protective cover. The second insertion slot is connected with a charging dock of the gaming device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an auxiliary device for a gaming device. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 1:
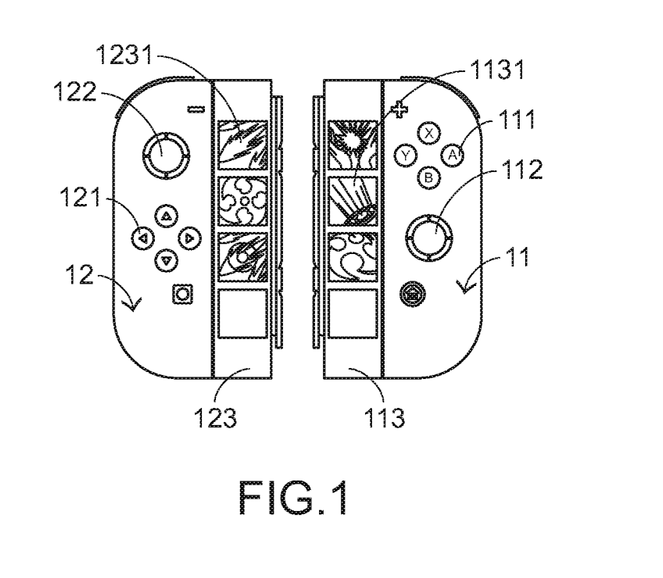
FIG. 1 is a schematic top view illustrating an auxiliary device for a gaming device according to a first embodiment of the present invention.

FIG. 1 is a schematic top view illustrating an auxiliary device for a gaming device according to a first embodiment of the present invention. In FIG. 1, a first handlebar controller 11 and a second handlebar controller 12 of the gaming device are shown. The first handlebar controller 11 comprises plural first keys 111, a first joystick 112 and a first extension key module 113. In this embodiment, the gaming device is Nintendo Switch. The structures and functions of the plural first keys 111 and the first joystick 112 are identical to those of the gaming device provided by the original factory (i.e., Nintendo Switch) and are not redundantly described herein. The first extension key module 113 is designed to overcome the problems of the conventional technologies. The first extension key module 113 is integrated into the first handlebar controller 11 by an assembling process. Moreover, the first extension key module 113 is electrically connected with the internal circuitry of the first handlebar controller 11. The first extension key module 113 comprises plural first extension keys 1131. According to the practical requirements, at least one first extension key 1131 is defined as the required function key.

Similarly, the second handlebar controller 12 comprises plural second keys 121, a second joystick 122 and a second extension key module 123. In this embodiment, the structures and functions of the plural second keys 121 and the second joystick 122 are identical to those of the gaming device provided by the original factory and are not redundantly described herein. The second extension key module 123 is integrated into the second handlebar controller 12 by an assembling process. Moreover, the second extension key module 123 is electrically connected with the internal circuitry of the second handlebar controller 12. The second extension key module 123 comprises plural second extension keys 1231. According to the practical requirements, at least one second extension key 1231 is defined as the required function key. In this embodiment, the auxiliary device for the gaming device comprises the first extension key module 113 and the second extension key module 123.

Figure 2:
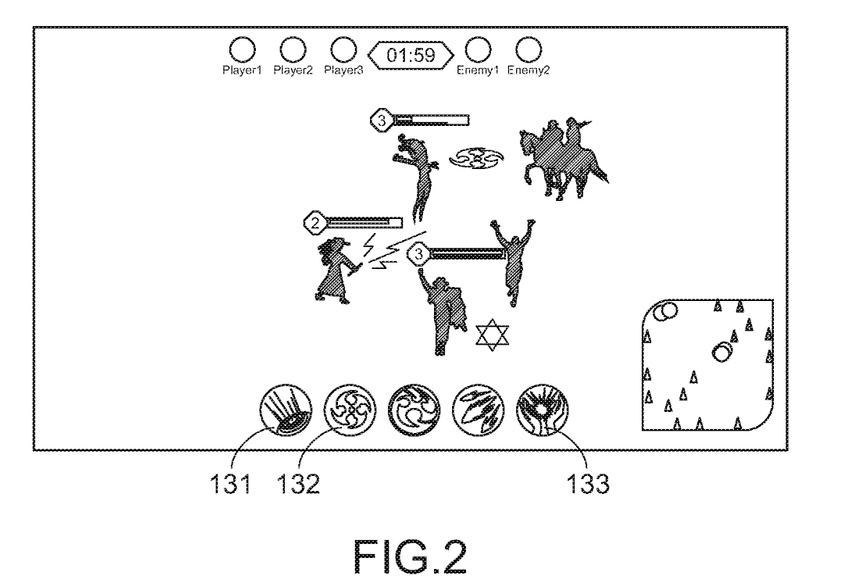
FIG. 2 schematically illustrates a screen image when a gaming software corresponding to the gaming device of the first embodiment is executed.

Please refer to FIGS. 1 and 2. FIG. 2 schematically illustrates a screen image when a gaming software corresponding to the gaming device of the first embodiment is executed. The gaming software as shown in FIG. 2 is published by the original computer online game provider. Since this gaming software is favored by many users, this gaming software is also installed in the gaming device of the present invention. The gaming software is the cross-platform software that can be implemented on the computer and Nintendo Switch. For example, the gaming software is Fortnite, Diablo iii, Arena of Valor, or the like. In accordance with the feature of the cross-platform software, the command input operations in the computer are executed through the keys of a keyboard. Since many keys of the keyboard are seldom used, the user may predefine function keys of the keyboard to execute specified command input operations. However, the numbers of the plural first keys 111 and the plural second keys 121 of the gaming device are limited. Consequently, when the gaming software is installed in Nintendo Switch, the user cannot set plural keys to execute specified command input operations.

For example, plural command options 131, 132 and 133 are shown in FIG. 2. When the X key of the first handlebar controller 11 and the down key of the second handlebar controller 12 are simultaneously pressed, the input function of the common option 131 is activated. When the X key of the first handlebar controller 11 and the L key of the second handlebar controller 12 are simultaneously pressed, the input function of the common option 132 is activated. When the X key and the B key of the first handlebar controller 11 are simultaneously pressed, the input function of the common option 133 is activated. The user has to memorize the keys corresponding to these command options 131-433 in advance. Consequently, the user can accurately activate the input functions corresponding to these command options 131-433. In accordance with a feature of the present invention, the arrangement of the first extension key module 113 of the first handlebar controller 11 and the second extension key module 123 of the second handlebar controller 12 can overcome the above drawbacks.

According to the practical requirements, the command option 131 is correlated to one first extension key 1131 of the first extension key module 113 of the first handlebar controller 11. Consequently, if the first extension key 1131 is pressed while the user is playing the game, the gaming software executed the input function of the command option 131.

Similarly, according to the practical requirements, the command options 132 and 133 are respectively correlated to two second extension keys 1231 of the second extension key module 123 of the second handlebar controller 12. If the second extension key 1231 corresponding to the command option 132 is pressed while the user is playing the game, the gaming software executed the input function of the command option 132. Whereas, if the second extension key 1231 corresponding to the command option 133 is pressed while the user is playing the game, the gaming software executes the input function of the command option 133.

Figure 3:
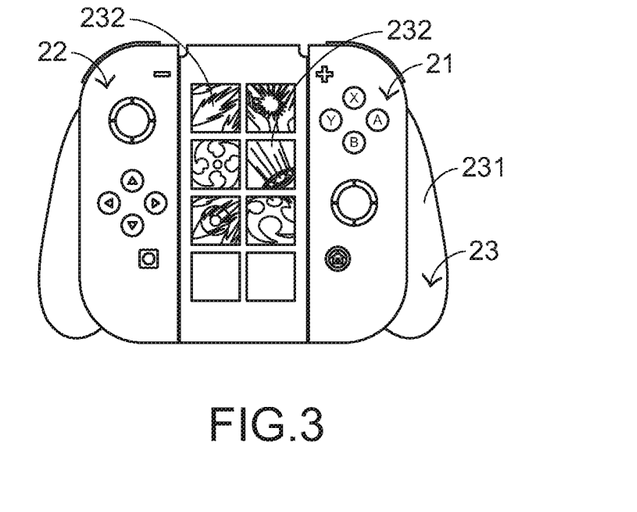
FIG. 3 is a schematic top view illustrating an auxiliary device for a gaming device according to a second embodiment of the present invention.

The present invention further provides an auxiliary device for a gaming device according to a second embodiment. FIG. 3 is a schematic top view illustrating an auxiliary device for a gaming device according to a second embodiment of the present invention. In FIG. 3, a first handlebar controller 21, a second handlebar controller 22 and an auxiliary handlebar controller 23 of the gaming device are shown. The structures and the functions of the first handlebar controller 21 and the second handlebar controller 22 are identical to those of the gaming device provided by the original factory, and are not redundantly described herein. The auxiliary handlebar controller 23 comprises a handlebar bracket 231 and plural extension keys 232. The structure of the handlebar bracket 231 is identical to that of the gaming device provided by the original factory, and is not redundantly described herein. The plural extension keys 232 are installed on the handlebar bracket 231. Like the first extension keys 1131 and the second extension keys 1231, the plural extension keys 232 are correlated to the command options 131-133 according to the settings. In this embodiment, the auxiliary device for the gaming device comprises the plural extension keys 232.

From the above descriptions, the auxiliary devices of the first embodiment and the second embodiment can increase the key number of the gaming device in order to overcome the drawbacks of the conventional technologies.

Figure 4:
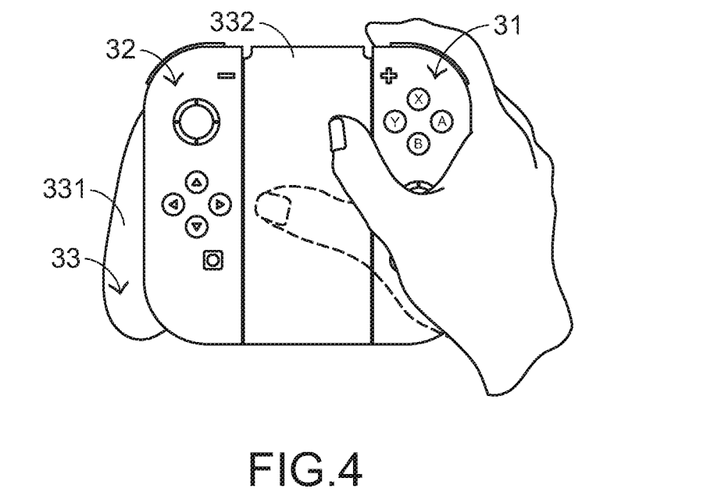
FIG. 4 is a schematic top view illustrating an auxiliary device for a gaming device according to a third embodiment of the present invention.

The present invention further provides an auxiliary device for a gaming device according to a third embodiment. FIG. 4 is a schematic top view illustrating an auxiliary device for a gaming device according to a third embodiment of the present invention. In FIG. 4, a first handlebar controller 31, a second handlebar controller 32 and an auxiliary handlebar controller 33 of the gaming device are shown. The structures and the functions of the first handlebar controller 31 and the second handlebar controller 32 are identical to those of the gaming device provided by the original factory, and are not redundantly described herein. The auxiliary handlebar controller 33 comprises a handlebar bracket 331 and a touch input module 332. The structure of the handlebar bracket 331 is identical to that of the gaming device provided by the original factory, and is not redundantly described herein. The touch input module 332 is installed on the handlebar bracket 331. When the user's finger slides on the touch input module 332, the touch input module 332 detects the movement of the user's finger and generates a touch signal corresponding to the movement of the user's finger. In accordance with the advantages of the auxiliary device of this embodiment, the touch control function of the gaming device is not limited to the tabletop mode or the handheld mode.

Figure 12:
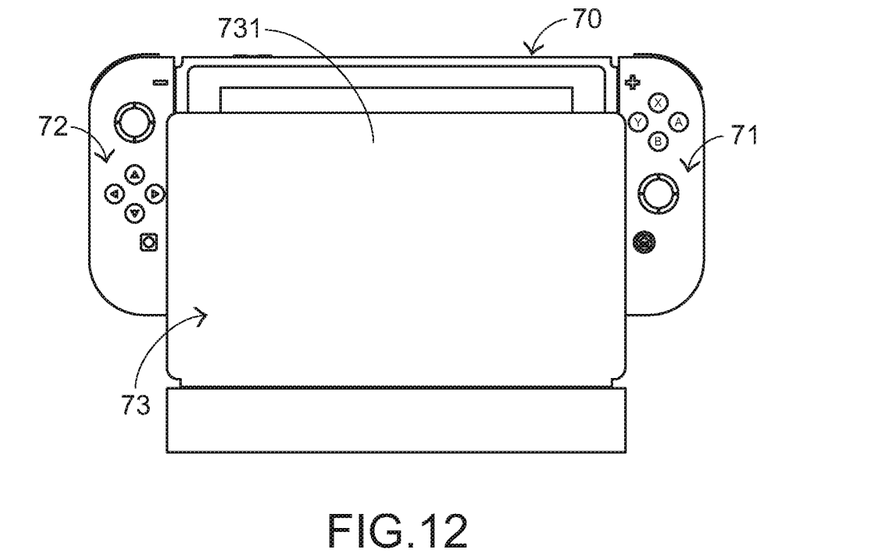
FIG. 12 is a schematic top view illustrating an auxiliary device for a gaming device according to a seventh embodiment of the present invention.
Figure 13A:
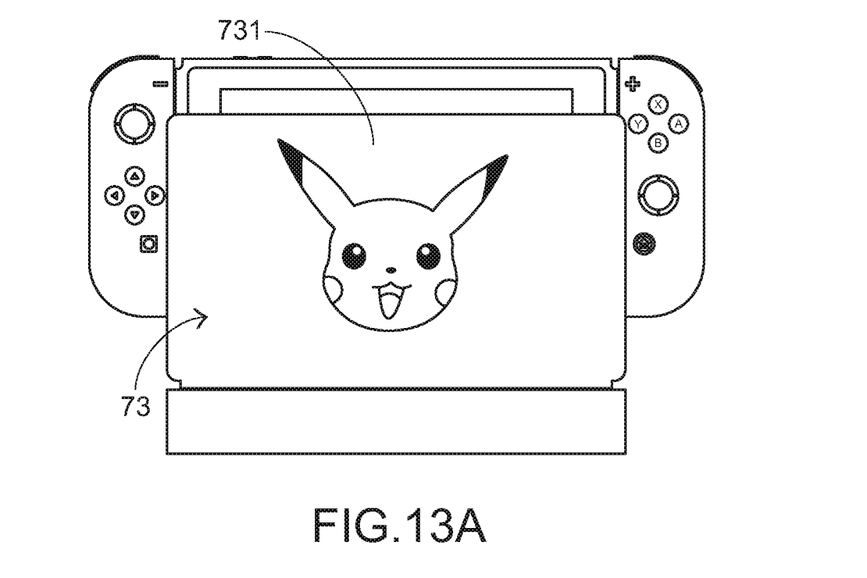
FIGS. 13A to 13D schematically illustrate the screen images when a gaming software corresponding to the gaming device of the seventh embodiment is executed.
Figure 13B:
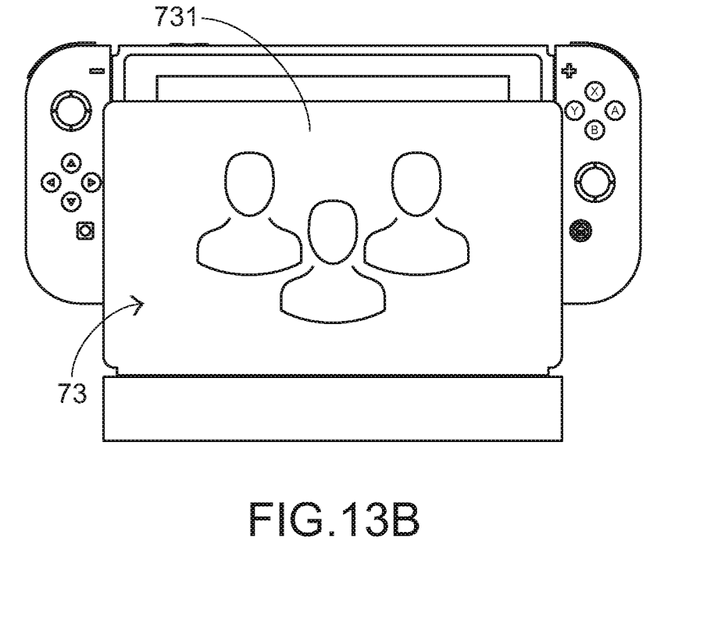
Figure 13C:
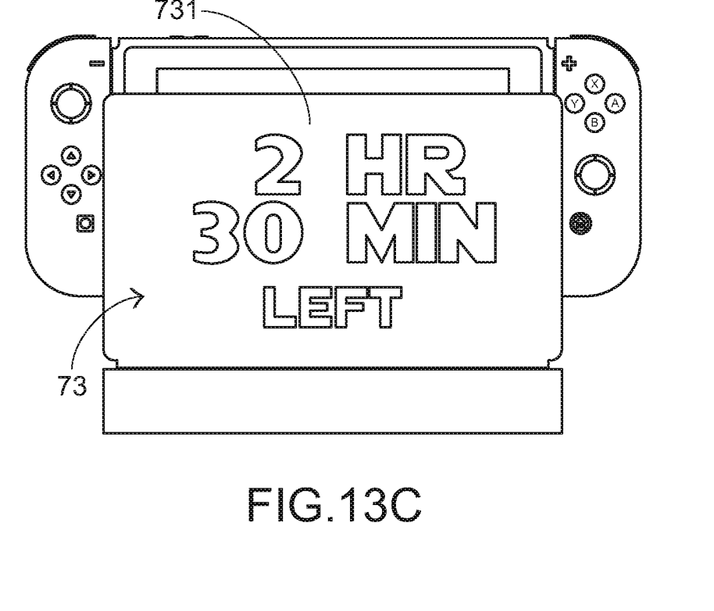
Figure 13D:
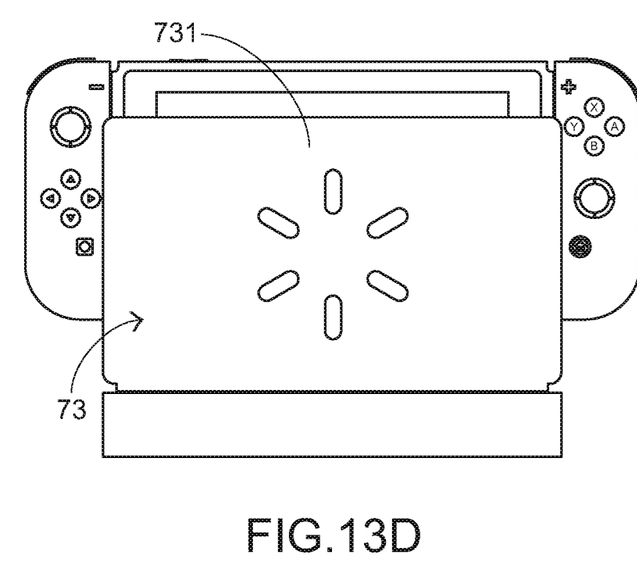

When the gaming device is in the TV mode, the game console of the gaming device is place in a charging dock (see FIG. 12). Under this circumstance, the touch screen of the game console is hidden by the charging dock and the touch control function cannot be used. For solving this problem, the touch input module 332 is installed on the handlebar bracket 331 in this embodiment. Consequently, the touch control function can be used when the gaming device is in any play mode.

Figure 5A:
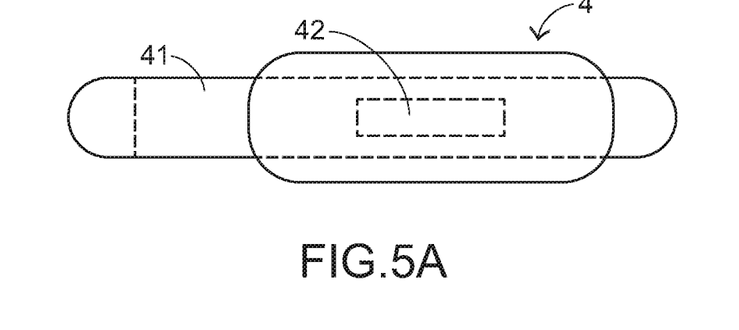
FIG. 5A is a schematic front view illustrating an auxiliary device for a gaming device according to a fourth embodiment of the present invention.
Figure 5B:
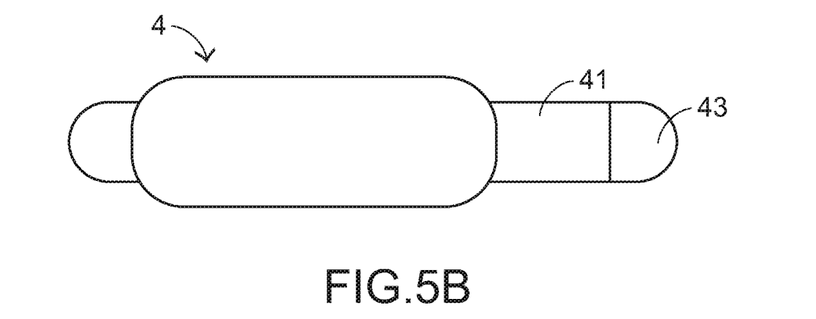
FIG. 5B is a schematic front view illustrating the auxiliary device according to the fourth embodiment of the present invention.
Figure 6:
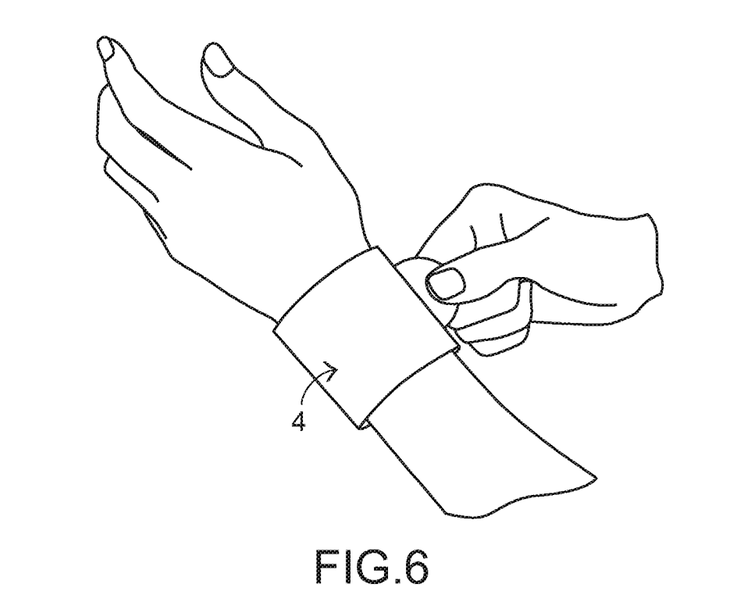
FIG. 6 schematically illustrates the auxiliary device of the fourth embodiment worn on the user.

For complying with the body motion gaming software, the structure of the auxiliary device for the gaming device will be further modified. Please refer to FIGS. 5A, 5B and 6. FIG. 5A is a schematic front view illustrating an auxiliary device for a gaming device according to a fourth embodiment of the present invention. FIG. 5B is a schematic front view illustrating the auxiliary device according to the fourth embodiment of the present invention. FIG. 6 schematically illustrates the auxiliary device of the fourth embodiment worn on the user. In this embodiment, the auxiliary device 4 comprises a strap-like main body 41, a sensing module 42 and a fixing structure 43. The strap-like main body 41 is wound around a wrist of the user. In addition, the strap-like main body 41 is fixed on the wrist through the fixing structure 43. The example of the fixing structure 43 is not restricted. That is, any component with the fixing function can be used as the fixing structure 43. For example, the fixing structure 43 includes the assembly of the openings and the buckle of the strap-like main body or a hook-and-loop fastener (i.e., Velcro tape).

Figure 7:
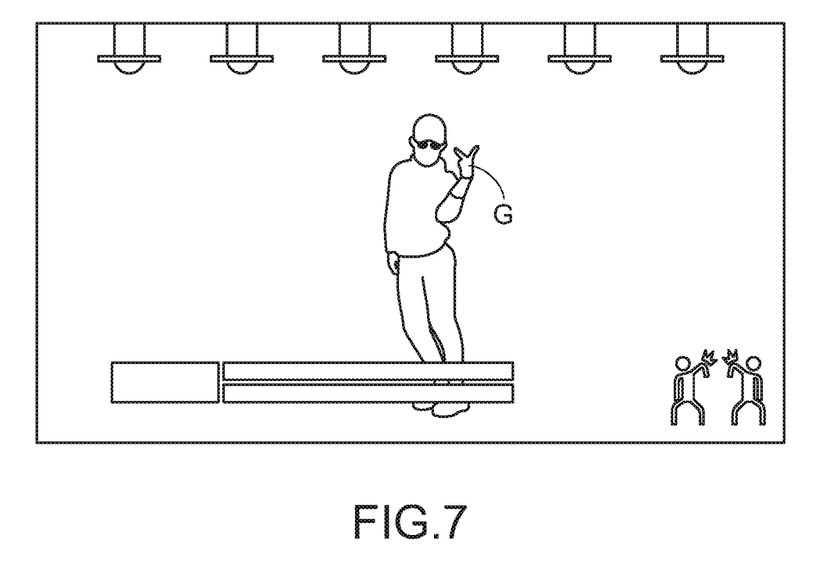
FIG. 7 schematically illustrates a screen image when a gaming software corresponding to the gaming device of the fourth embodiment is executed.

The sensing module 42 is disposed within the strap-like main body 41 and wirelessly connected with the gaming device. The sensing module 42 is used for sensing the action of the user's wrist and generating an output signal corresponding to the action of the user's wrist. In this embodiment, the auxiliary device 4 is a body motion strap. That is, the auxiliary device 4 is wearable. When the user wears the wearable auxiliary device 4 to play the body motion game, the body motion gaming software (e.g., Just Dance or Fit Boxing) can be executed without the need of holding the first handlebar controller or the second handlebar controller with hands. For example, while the body motion gaming software is executed to generate a hand gesture G (i.e., a Yeah gesture as shown in FIG. 7), the user can produce the same gesture.

Figure 8:
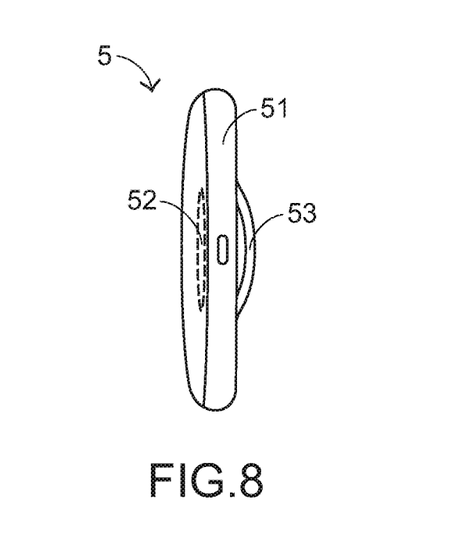
FIG. 8 is a schematic side view illustrating an auxiliary device for a gaming device according to a fifth embodiment of the present invention.

FIG. 8 is a schematic side view illustrating an auxiliary device for a gaming device according to a fifth embodiment of the present invention. In this embodiment, the auxiliary device 5 comprises a main body 51, a sensing module 52 and a fixing strap 53. The fixing strap 53 is disposed on the main body 51. A hollow portion is formed between the main body 51 and the fixing strap 53. Consequently, the palm or the foot sole of the user can penetrate through the hollow portion. That is, the auxiliary device 5 can be worn on the human body of the user. The sensing module 52 is disposed within the main body 51 and wirelessly connected with the gaming device. The sensing module 52 is used for sensing the tapping action of the user's palm or foot sole and generating an output signal corresponding to the tapping action.

Figure 9A:
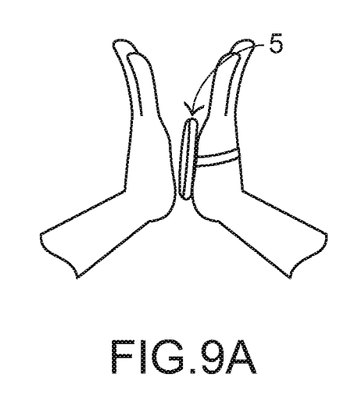
FIGS. 9A and 9B are schematic side views illustrating two usage scenarios of the auxiliary device of the fifth embodiment when the auxiliary device is held by the user.
Figure 9B:
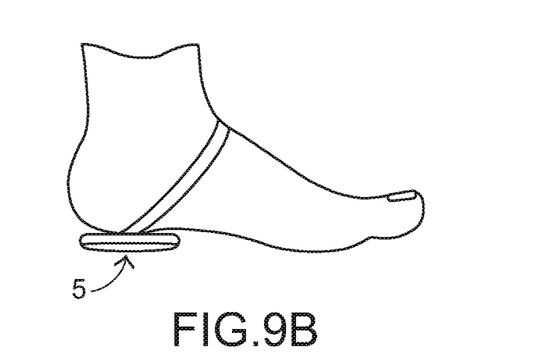

In this embodiment, the auxiliary device 5 is a metronome, and the main body 51 has a disc shape. When a body motion gaming software (e.g., Rhythm Tengoku, which is developed by Nintendo SPD) is executed, the user may beat time in the habitual manner to play the game through the use of the auxiliary device 5 that is worn on the user's palm or foot sole. FIGS. 9A and 9B schematically illustrate two scenarios of using the auxiliary device 5. The auxiliary device 5 can be used to input commands in a more intuitive manner. That is, the use of the auxiliary device 5 can replace the conventional input method of beating time through the first handlebar controller or the second handlebar controller.

Figure 10:
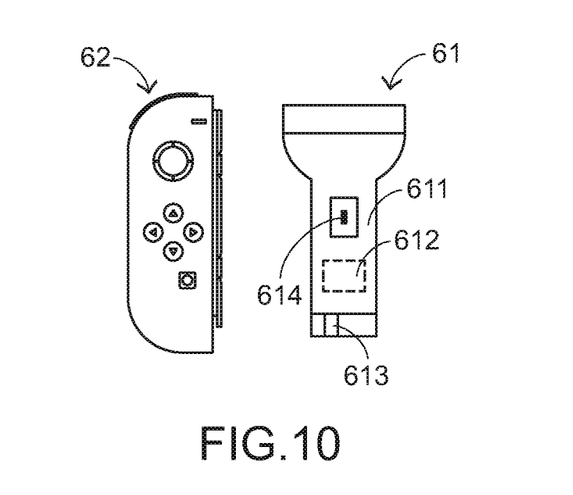
FIG. 10 is a schematic top view illustrating an auxiliary device for a gaming device according to a sixth embodiment of the present invention.

FIG. 10 is a schematic top view illustrating an auxiliary device for a gaming device according to a sixth embodiment of the present invention. In FIG. 10, a flashlight-shaped handlebar controller 61 and a second handlebar controller 62 are shown. The structures and the functions of the second handlebar controller 62 are identical to those of the gaming device provided by the original factory, and are not redundantly described herein. The flashlight-shaped handlebar controller 61 comprises a main body 611, a sensing module 612, a prompt lamp 613 and a pressure sensing key 614. The sensing module 612 is disposed within the main body 611 and wirelessly connected with the gaming device. The sensing module 612 is used for sensing the swinging direction of the flashlight-shaped handlebar controller 61 in order to change the viewing angle of the player of the gaming software. The prompt lamp 613 is disposed on a front side of the main body 611. The prompt lamp 613 can emit light beams with different colors in order to provide different prompt functions. The pressure sensing key 614 is disposed on the main body 611. The pressure sensing key 614 is used for detecting a pressure that is exerted thereon. In addition, the pressure sensing key 614 generates a pressure sensing signal corresponding to the detected pressure. In this embodiment, the main body 611 has a flashlight-shaped profile.

Figure 11A:
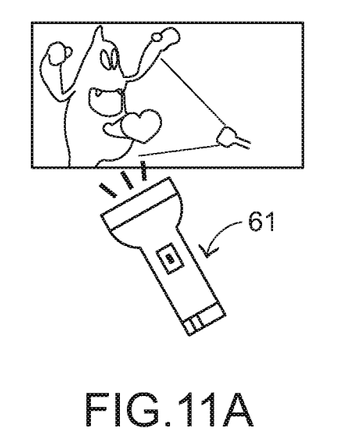
FIGS. 11A and 11B schematically illustrate the screen images when a gaming software corresponding to the gaming device of the sixth embodiment is executed.
Figure 11B:
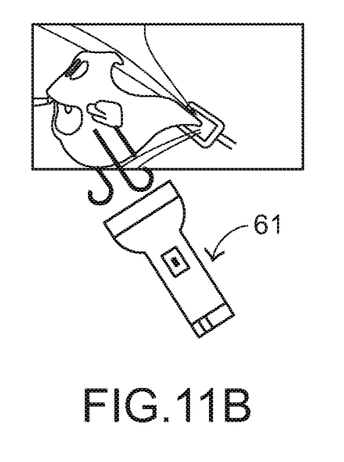

Please refer to FIGS. 10, 11A and 11B. FIGS. 11A and 11B schematically illustrate the screen images when a gaming software corresponding to the gaming device of the sixth embodiment is executed. In FIGS. 11A and 11B, the screen image corresponding to the gaming software of a ghost mansion game is shown. When the gaming software is executed, a vacuum cleaner is used to catch the appearing ghosts. The user may hold the flashlight-shaped handlebar controller 61 and the second handlebar controller 62 with both hands to play the game. Moreover, while the flashlight-shaped handlebar controller 61 is aimed at the game console and the flashlight-shaped handlebar controller 61 is swung, the viewing angle of the player in the gaming software can be changed. Consequently, the user can watch the surrounding to look for ghosts.

The prompt lamp 613 provides the following prompting functions. The prompt lamp 613 emits the light beams with a first color (e.g., a blue color) to indicate that no ghosts appear around the player of the gaming software. The prompt lamp 613 emits the light beams with a second color (e.g., a yellow color) to indicate that ghosts appear around the player of the gaming software. The prompt lamp 613 emits the light beams with a third color (e.g., a red color) to indicate that ghosts come into sight of the player of the gaming software.

When ghosts come into sight of the player of the gaming software, the user may press the pressure sensing key 614. Correspondingly, the player of the gaming software turns on the vacuum cleaner to capture the ghosts. In case that the pressure sensing key 614 is pressed lightly, the vacuum cleaner generates a weaker suction force. In case that the pressure sensing key 614 is pressed heavily, the vacuum cleaner generates a stronger suction force in order to catch ghosts at increased efficiency.

The present invention further provides an auxiliary device for a gaming device according to a seventh embodiment. FIG. 12 is a schematic top view illustrating an auxiliary device for a gaming device according to a seventh embodiment of the present invention. In FIG. 12, a game console 70, a first handlebar controller 71, a second handlebar controller 72 and a charging dock 73 of the gaming device are shown. The structures and the functions of the game console 70, the first handlebar controller 71 and the second handlebar controller 72 are identical to those of the gaming device provided by the original factory, and are not redundantly described herein. In comparison with the conventional charging dock (also referred as Switch Dock), the charging dock 73 of this embodiment is distinguished. In this embodiment, the charging dock 73 further comprises a display panel 731. The display panel 731 is located at an outer surface of the charging dock 73. According to the settings, the desired screen image is shown on the display panel 731. Preferably, the screen image shown on the display panel 731 is colorful. FIGS. 13A to 13D schematically illustrate the screen images shown on the display screen 731.

Figure 14:
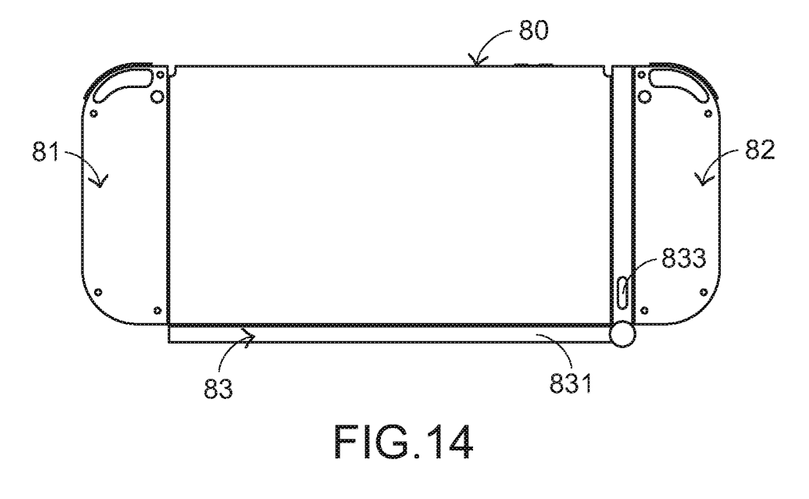
FIG. 14 is a schematic rear view illustrating a gaming device with an auxiliary device according to an eighth embodiment of the present invention.

FIG. 14 is a schematic rear view illustrating a gaming device with an auxiliary device according to an eighth embodiment of the present invention. In FIG. 14, a game console 80, a first handlebar controller 81, a second handlebar controller 82 and an auxiliary device 83 of the gaming device are shown. The structures and the functions of the game console 80, the first handlebar controller 81 and the second handlebar controller 82 are identical to those of the gaming device provided by the original factory, and are not redundantly described herein. The game console 80, the first handlebar controller 81 and the second handlebar controller 82 are combined together through the auxiliary device 83. Consequently, the problems of using the gaming software according to the conventional technology will be overcome.

Figure 15A:
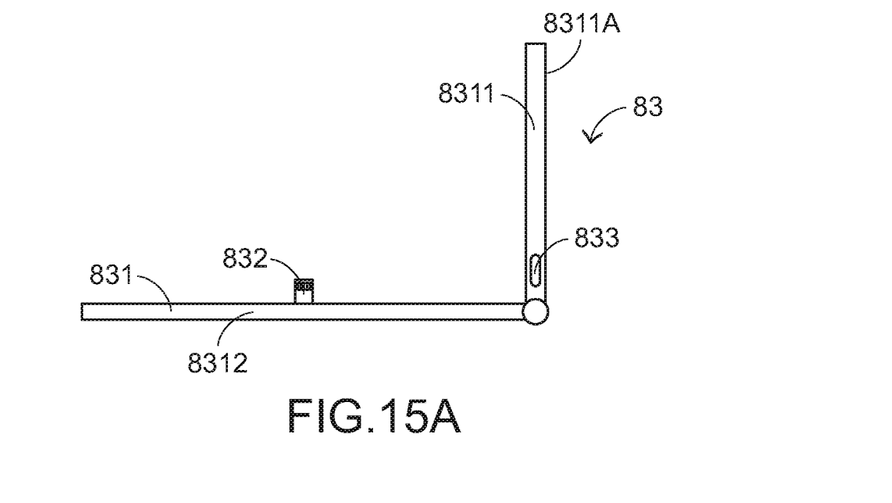
FIG. 15A is a schematic rear view illustrating the auxiliary device according to the eighth embodiment of the present invention.
Figure 15B:
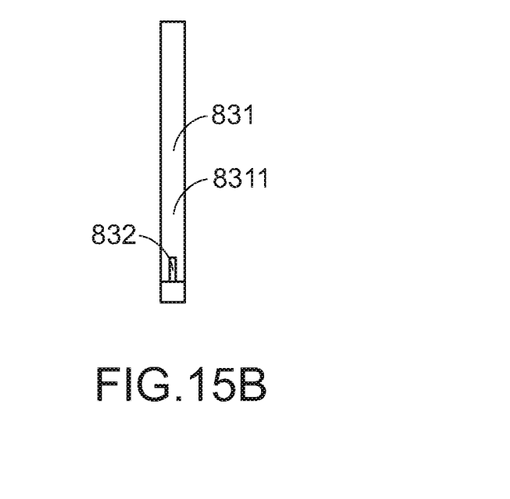
FIG. 15B is a schematic right view illustrating the auxiliary device according to the eighth embodiment of the present invention.
Figure 15C:
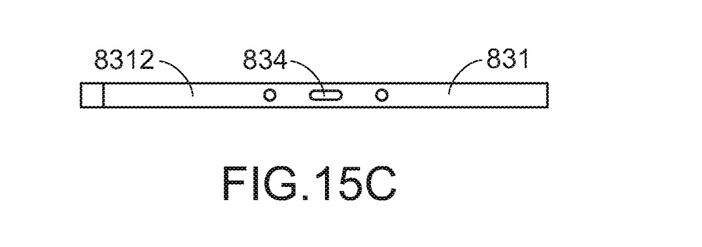
FIG. 15C is a schematic bottom view illustrating the auxiliary device according to the eighth embodiment of the present invention.

The structure of the auxiliary device 83 will be described as follows. Please refer to FIGS. 15A, 15B and 15C. FIG. 15A is a schematic rear view illustrating the auxiliary device according to the eighth embodiment of the present invention. FIG. 15B is a schematic right view illustrating the auxiliary device according to the eighth embodiment of the present invention. FIG. 15C is a schematic bottom view illustrating the auxiliary device according to the eighth embodiment of the present invention. The auxiliary device 83 comprises a support body 831, a connecting part 832, a first insertion slot 833 and a second insertion slot 834. The support body 831 is coupled with the game console 80, the first handlebar controller 81 and the second handlebar controller 82. The support body 831 comprises a first supporting part 8311 and a second supporting part 8312. The second supporting part 8312 is connected with the first supporting part 8311. The first supporting part 8311 is connected with a sidewall of the game console 80. The second supporting part 8312 is connected with a bottom side of the game console 80. Moreover, the first supporting part 8311 comprises a third insertion slot 8311A. The third insertion slot 8311A is formed in an outer surface of the first supporting part 8311. Moreover, the third insertion slot 8311A is coupled with the second handlebar controller 82. In this embodiment, the auxiliary device 83 is an auxiliary bracket. In addition, the support body 831 is L-shaped.

The connecting part 832 is disposed on the support body 831 and aligned with a connection port (e.g., a charging port) of the game console 80. When the support body 831 and the game console 80 are combined together, the connecting part 832 is inserted into the charging port of the game console 80. Consequently, the electric connection between the auxiliary bracket 83 and the game console 80 is established. The first insertion slot 833 is formed in a first outer surface of the support body 831 and exposed outside the support body 831.

Moreover, the first insertion slot 833 can be connected with a charging cable of the gaming device. The second insertion slot 834 is formed in a second outer surface of the support body 831 and exposed outside the support body 831. The second insertion slot 834 can be connected with the charging dock of the gaming device (see FIG. 12). In an embodiment, the changing port of the game console is a USB type-C transmission interface, and the connecting part 832 is the mating USB type-C transmission interface.

As shown in FIGS. 15A, 15B and 15C, the connecting part 832 is disposed on an inner surface of the second supporting part 8312, the second insertion slot 834 is formed in a bottom surface of the second supporting part 8312, and the first insertion slot 833 is formed in a rear surface of the first supporting part 8311.

Due to the auxiliary device 83, the user can simultaneously play the game and charge the gaming device when the gaming device is in the tabletop mode. Consequently, the drawbacks of the conventional technologies can be overcome. Generally, when the gaming device is in the tabletop mode, the charging port in the bottom side of the game console is hindered by the supporting plane (e.g., the table surface or any other appropriate flat platform), and thus the charging port cannot be connected with the charging cable (not shown) of the gaming device. However, when the support body 831 and the game console 80 are combined together (see FIG. 14), the charging cable is inserted into the first insertion slot 833, which is exposed outside the support body 831. Consequently, the game console 80 can be charged. At the same time, the game console 80 can execute the gaming software.

Moreover, the size of the auxiliary device 83 is specially designed to match the charging dock of the gaming device, and thus the auxiliary device 83 can be plugged into the charging dock. The structure of the charging dock can be shown in FIG. 12. For changing the play mode of the gaming device with the auxiliary device 83 to the TV mode, the auxiliary device 83 and the game console 80 are plugged into the charging dock. Consequently, the gaming device enters the TV mode. In contrast, after the commercially available auxiliary bracket is detached from the game console and then the game console is plugged into the charging dock, the gaming device enters the TV mode. In other words, the use of the auxiliary device 83 of the present invention can facilitate changing the play mode of the gaming device.

Figure 16:
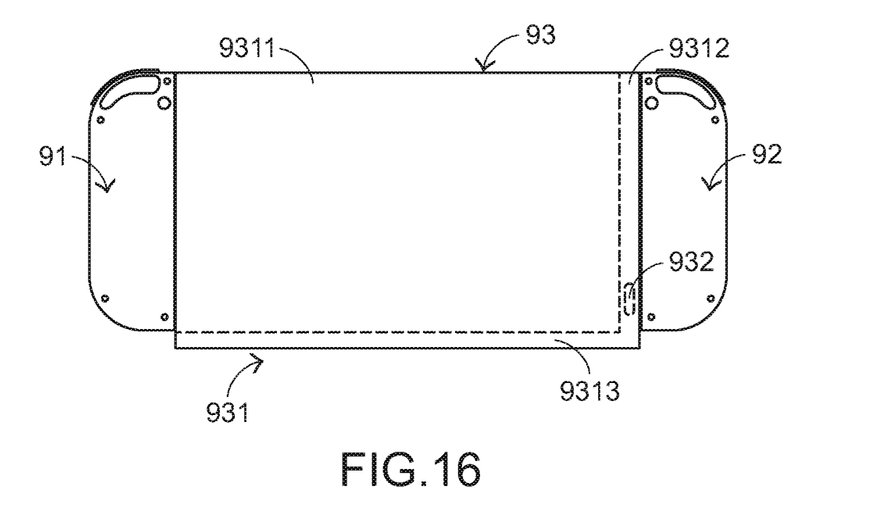
FIG. 16 is a schematic rear view illustrating a gaming device with an auxiliary device according to a ninth embodiment of the present invention.

FIG. 16 is a schematic rear view illustrating a gaming device with an auxiliary device according to a ninth embodiment of the present invention. As shown in FIG. 16, the gaming device comprises a game console (not shown), a first handlebar controller 91, a second handlebar controller 92 and an auxiliary device 93. The auxiliary device 93 comprises a protective cover 931, a connecting part (not shown), a first insertion slot 932 and a second insertion slot (not shown). The structures and the functions of the game console, the first handlebar controller 91 and the second handlebar controller 92 are identical to those of the gaming device provided by the original factory, and are not redundantly described herein. Except that the support body 831 is replaced by the protective cover 931, the components of the auxiliary device of this embodiment are substantially identical to those of the eighth embodiment.

The protective cover 931 is sheathed around the game console to partially cover the game console in order to provide the function of protecting the game console. The first side and the second side have a first opening and a second opening corresponding to the first handlebar controller 91 and the second handlebar controller 92, respectively. Consequently, the first handlebar controller 91 and the second handlebar controller 92 are combined with the covered game console. That is, when the game console is protected by the protective cover, the game console can still be combined with the first handlebar controller 91 and the second handlebar controller 92. The structures and functions of the connecting part, the first insertion slot 932 and the second insertion slot are similar to those of the eighth embodiment, and are not redundantly described herein.

The protective cover 931 comprises a covering body 9311, a first lateral part 9312 and a second lateral part 9313. The first lateral part 9312 is located beside a first side of the covering body 9311 and coupled with a latera wall of the game console. The second lateral part 9313 is located beside a second side of the covering body 9311 and coupled with a bottom side of the game console. The structures and functions of the first lateral part 9312 are similar to those of the first supporting part 8311 of the eighth embodiment. The structures and functions of the second lateral part 9313 are similar to those of the second supporting part 8312 of the eighth embodiment. That is, the connecting part is disposed on an inner surface of the second lateral part 9313, the second insertion slot (not shown) is formed in a bottom surface of the second lateral part 9313, and the first insertion slot 932 is formed in a rear surface of the first lateral part 9312.

Especially, the concept of designing the shape of the protective cover 931 is similar to the concept of designing the support body 831 of the eighth embodiment. For changing the play mode of the gaming device with the protective cover 931 to the TV mode, the protective cover 931 and the game console are plugged into the charging dock. Consequently, the gaming device enters the TV mode. According to the practical requirement, the picture corresponding to the gaming software may be formed on the protective cover 931. Alternatively, the customized picture is formed on the protective cover 931 according to the user's requirements.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An auxiliary device for a gaming device, the auxiliary device being combined with the gaming device, the auxiliary device comprising:
   a support body coupled with the gaming device;
   a connecting part disposed on the support body, wherein the connecting part is inserted into a connection port of the gaming device, so that the auxiliary device is electrically connected with the gaming device;
   a first insertion slot formed in a first outer surface of the support body, and exposed outside the support body, wherein the first insertion slot is connected with a charging cable of the gaming device; and
   a second insertion slot formed in a second outer surface of the support body, and exposed outside the support body, wherein the second insertion slot is connected with a charging dock of the gaming device.

2. The auxiliary device according to claim 1, wherein the support body comprises:
   a first supporting part connected with a sidewall of a game console of the gaming device; and a second supporting part connected with the first supporting part, and connected with a bottom side of the game console, wherein the connecting part is disposed on an inner surface of the second supporting part, the second insertion slot is formed in a bottom surface of the second supporting part, and the first insertion slot is formed in a rear surface of the first supporting part.

3. The auxiliary device according to claim 2, wherein the first supporting part further comprises a third insertion slot, wherein the third insertion slot is formed in an outer surface of the first supporting part, and the third insertion slot is coupled with a handlebar controller of the gaming device.

4. The auxiliary device according to claim 3, wherein when the game console and the handlebar controller are combined with the support body and the support body is connected with the charging dock, the charging dock connected with the support body is placed on a supporting plane and the charging cable is inserted into the first insertion slot, so that electric power is transmitted to the game console.

5. The auxiliary device according to claim 1, wherein the support body is L-shaped.

6. The auxiliary device according to claim 1, wherein the charging dock comprises a display panel, wherein the display panel is located at an outer surface of the charging dock, and a colorful picture is shown on the display panel.

7. An auxiliary device for a gaming device, the auxiliary device being combined with the gaming device, the auxiliary device comprising:

a protective cover, wherein the gaming device is partially covered by the protective cover;

a connecting part disposed on an inner surface of the protective cover, wherein when the gaming device is partially covered by the protective cover and the connecting part is inserted into a connection port of the gaming device, the auxiliary device is electrically connected with the gaming device;

a first insertion slot formed in a first outer surface of the protective cover, and exposed outside the protective cover, wherein the first insertion slot connected with a charging cable of the gaming device; and a second insertion slot formed in a second outer surface of the protective cover, and exposed outside the protective cover, wherein the second insertion slot is connected with a charging dock of the gaming device.

8. The auxiliary device according to claim 7, wherein the protective cover comprises:

a covering body;

a first lateral part located beside a first side of the covering body, and coupled with a sidewall of a game console of the gaming device; and a second lateral part located beside a second side of the covering body, and coupled with a bottom side of the game console, wherein the connecting part is disposed on an inner surface of the second lateral part, the second insertion slot is formed in a bottom surface of the second lateral part, and the first insertion slot is formed in a rear surface of the first lateral part.

9. The auxiliary device according to claim 8, wherein the first lateral part further comprises a third insertion slot, wherein the third insertion slot is formed in an outer surface of the first lateral part, and the third insertion slot is coupled with a handlebar controller of the gaming device.

10. The auxiliary device according to claim 9, wherein when the game console and the handlebar controller are combined with the protective cover and the protective cover is connected with the charging dock, the charging dock connected with the protective cover is placed on a supporting plane and the charging cable is inserted into the first insertion slot, so that electric power is transmitted to the game console.

11. The auxiliary device according to claim 7, wherein the charging dock comprises a display panel, wherein the display panel is located at an outer surface of the charging dock, and a colorful picture is shown on the display panel.

* * * * *